United States Patent Office 3,153,595
Patented Oct. 20, 1964

3,153,595
CULINARY MIXES CONTAINING A POLYVINYL PYRROLIDONE
Herman H. Tiedemann, Scotch Plains, N.J., assignor to General Aniline & Film Corporation, New York, N.Y., a corporation of Delaware
No Drawing. Filed June 10, 1963, Ser. No. 286,507
3 Claims. (Cl. 99—94)

The present invention relates, in general, to culinary mixes and, in particular, to dry cake mixes containing sugar, farinaceous material and shortening, from which baking batters can be readily prepared by the addition thereto of liquid materials.

The so-called "dry" prepared cake mixes employed for baking are generally made by combining a sugar, farinaceous materials, shortening and other ingredients, including leavening, milk solids, egg solids, flavoring and coloring to form a free-flowing granular mixture. To prepare these dry mixes for baking, liquid materials such as water, milk, or eggs are added and the combination is beaten to form a homogeneous mixture and to incorporate air therein. The resultant batter is then baked.

It has been observed that when dry prepared mixes are aged certain changes occur in the mixes which affect the ultimate quality and appearance of the goods baked therefrom. It has further been observed that some dry prepared cake mixes tend to degrade in batter making and baking procedures as evidenced by the loss of moisture and flavor of the resultant baked product. Additionally, it has been observed that the mixes dry out and lose flavor during periods of storage. In general, the lack of sufficient keeping qualities of dry prepared mixes results in baked products that are unattractive in appearance, dry and, in some instances, tasteless.

It has now been found in accordance with the present invention that dry prepared mixes can be made which will produce baked goods superior to those prepared from prior art mixes and which are less susceptible to the aforementioned disadvantages.

Accordingly, it is an object of this invention to provide prepared culinary mixes which have improved keeping qualities and which are superior to those of prior art mixes.

Another object of this invention is to provide culinary mixes which are more tolerant than are prior art mixes to adverse conditions of batter making and baking.

Yet another object of this invention resides in the provision of new culinary mixes which are designed to retain moisture and flavor during baking resulting in more palatable baked products.

In general, the invention comprises dry prepared cake mixes containing sugar, farinaceous materials and shortening, wherein said mixes contain uniformly distributed therethrough poylvinyl pyrrolidone.

The polyvinyl pyrrolidones which find immediate and practical utility in formulating the culintry mixes of the invention are well known in the art, having been described, for example in U.S. 2,265,450 and U.S. 2,335,454. The poylvinyl pyrrolidones are prepared by the bulk or solution polymerization of N-vinyl pyrrolidone using any of the well known conventional catalysts such as peroxides, ultraviolet light and heat to form polymers of varying molecular weights. The polymers so produced are usually available as a white or nearly white powder which is readily soluble in water and many common organic solvents such as alcohols, ketone, chlorinated hydrocarbons, lactones and the like.

The amount of polyvinyl pyrrolidone may vary for purposes of broadest usage within the range of 0.01–10% by dry weight of the total solids of the mix. It is preferred that the amount not exceed about 0.5%–1.5% as higher amounts may tend to impart a gummy or slimy impression in the mouth during mastication of the cakes prepared from such mixes. At the lower end, 0.1% is preferred in order that the contribution of the polyvinyl pyrrolidone may be fully evident. Between 0.1 and 0.01%, the lowest level of the broad range specified above, the effect of the additive is correspondingly decreased, becoming virtually non-existent below this level. As employed in the instant invention, the polyvinyl pyrrolidone is in the form supplied by the manufacturer, namely, as a white powder or aqueous solution. It is not necessary that these particles be dissolved in water; in fact, it is more satisfactory for the distribution of the polyvinyl pyrrolidone to add the same in the shortening since the shortening is preferably reduced to a liquid form by heating prior to batter making.

Except for the addition of polyvinyl pyrrolidone in the manner contemplated herein, the mixes of the invention are formulated in the same ways and with the same ingredients that are commonly employed in the art. This may be conveniently illustrated by the following general ranges for yellow type cakes and chocolate type cakes, respectively, all proportions being by weight.

Yellow type cake:

| Ingredients | Percent |
|---|---|
| Sugar | 35–50 |
| Flour | 35–50 |
| Shortening | 9–15 |
| Non-fat dried milk solids | 0.5–5.0 |
| Salt | 0.5–2.0 |
| Leavening | 1.0–4.0 |
| Egg solids | 0–5.0 |
| Flavoring (including spices) | 0.1–5.0 |
| Coloring, minor amount, if any. | |

Chocolate type cake:

| Ingredients— | |
|---|---|
| Sugar | 35–40 |
| Flour | 25–40 |
| Shortening | 9–15 |
| Non-fat dried milk solids | 0.5–3.0 |
| Leavening | 1.0–4.0 |
| Cocoa | 4.0–8.0 |
| Salt | 0.5–2.0 |
| Flavoring | 0.1–1.0 |
| Coloring, minor amount, if any. | |

All of the ingredients listed above may be of conventional type and quality. Thus, the flour may be the usual bleached cake flour, although a good general purpose flour can be substituted, especially if appropriate emulsifiers are provided. The ordinary granulated sugars are quite satisfactory, including sucrose, dextrose, maltose, fructose, lactose, and brown and invert sugars, alone or in combination. The ratio of sugar to flour may be adjusted as necessary for special circumstances but a ratio of sugar to flour in excess of 1:1 has long been known to result in particularly good cake mixes.

As to the shortening, any of the ordinary animal or vegetable fats, which may have been partially hydrogenated before use, is suitable. Preferably, the shortening should be of the so-called "emulsified" variety, containing up to 50%, and more normally about 5–25%, by weight, of one or more suitable emulsifiers. The partially esterified polyhydric compounds having surface active properties are an exceptionally valuable example of appropriate emulsifiers. This class of emulsifiers includes, among others, mono- and di-glycerides of fatty acids, such as monostearin, monopalmitin, monolein, and dipalmitin; partial fatty acid esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Mention may also be made of the partial esters of hydroxy carboxylic acids, such as lactic, citric, and tartaric acids, with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful. The condition of the shortening may vary from distinctly liquid to very firm. We have found that slightly better results are achieved with normally solid shortening and, in this case, dissemination throughout the dry ingredients is facilitated by melting the shortening prior to mixing, as is explained more fully later. This is not to imply that liquid shortenings do not produce acceptable cakes or that solid shortenings may not be mixed except in liquid condition, as any such implication would be erroneous.

The selection of a chemical leavening system from among those known in the art will pose no problem for one skilled in the formulation of culinary mixes. In general, such systems are composed of a baking soda, e.g., sodium, potassium, or ammonium bicarbonate, on the one hand, and one or more phosphate or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others. The amount of soda and the selected acid are so balanced as to achieve a pH in the resultant batter of about 6-10. Frequently, provision of a slight excess of soda is advantageous so as to assure absence of unreacted phosphate acid and/or to compensate for the acid tendencies of some batter ingredients.

For many mixes, it is accepted practice for the housewife to add the required amount of eggs in the course of batter preparation and this practice may be followed just as well in the present mixes. If desired, the inclusion of egg solids in the mix is an allowable alternative.

The function of, and permissible variations in, the remaining ingredients is sufficiently obvious to render a detailed explanation thereof unnecessary.

Once a suitable formulation has been established, consideration should be given to the mode of processing or compounding the ingredients thereof into the mix. For the purposes of this invention, the manner in which the polyvinyl pyrrolidone is incorporated into the shortening is not of principal significance. It is known that uniform distribution of particulate material in solid or plastic shortening is possible and this technique may be employed here. Preferably, the shortening should be in fluid condition during the addition of the polyvinyl pyrrolidone. If the selected shortening is normally liquid, all that need be done is to blend in the polyvinyl pyrrolidone particles until a homogeneous dispersion has been achieved. The art generally recognizes, however, that some normally liquid shortenings may be inferior for use in cakes to normally solid shortenings. Consequently, under many circumstances, a shortening of a normally solid type may be employed to better advantage. In this case, the shortening should be melted for ease of mixing prior to incorporation therein of the polyvinyl pyrrolidone. The temperature to which the shortening is heated for melting may vary between approximately 120°-180° F., with 140°-150° F. being preferred. At temperatures above 180° F. flour tends to be degraded and shortening tends to undergo oxidation. For batch operation, the shortening may be melted in a container of suitable capacity provided with a simple impeller-mixer, after which the predetermined amount of polyvinyl pyrrolidone is added while the mixer is running. Once a uniform dispersion has been obtained, it is added to the dry ingredients before the polyvinyl pyrrolidone particles have an opportunity to settle. For continuous operation, the polyvinyl pyrrolidone particles may be metered in proper proportion into the shortening supply conduit upstream of an in-line, impeller-type mixer provided within the conduit at a point sufficiently close to discharge to preclude significant separation of the mixture. Where the term "fluid condition" or equivalent appears herein, it will be understood as embracing both normally liquid shortening and melted normally solid shortening but excluding shortening in gaseous condition.

The procedure employed in compounding the mix may be that which is generally observed in the art. Essentially, the sequence of steps involves:

(1) The major ingredients, i.e., flour, sugar, and polyvinyl pyrrolidone-containing shortening, are blended into a homogeneous premix;

(2) The premix from step 1 is passed through an impact grinder to eliminate lumps or agglomerates;

(3) The de-lumped premix is subjected to the shearing and crushing treatment;

(4) The minor ingredients are uniformly incorporated and (5) The total mixture is subjected to impact grinding to eliminate lumps from final product.

The preparation of the mixes of the invention can be carried out continuously or batchwise. For batch operation, steps 1 and 4 may be carried out in a ribbon mixer, the mixing time being within the range of 1 to 30 minutes. For continuous operation, a paddle-type mixer is preferred for a mixing time of from 1 to 30 minutes, dependent upon the particular type of mixer employed. Since the shortening, if not normally liquid, is preferably melted to promote better distribution of the polyvinyl pyrrolidone particles, the more efficient practice is to maintain the shortening in liquid condition until added to the dry ingredients. The addition of solid shortening to dry ingredients, however, is a known alternative and may be adopted, if desired.

The product from the mixing equipment mentioned above often includes lumps or agglomerates and, for this reason, each mixing step is advantageously followed by impact grinding. The impact grinder employed in step 2 is preferably a hammermill, whereas for the final step an impact grinder of the type known in the art under the name "Entoleter" is preferred. The later device may be generally characterized as a "fling-type" grinder wherein the material to be ground is introduced into the center of a rapidly revolving circular array of pins enclosed within a fixed external shell. As the particles are hurled or flung outwardly by centrifugal force, they are intercepted and impacted by the whirling pins and, in rebounding from such impact, are impinged upon other pins or the external shell for further impacting, the action being repeated until the particles clear the pin array and pass out of the device. In addition to pulverizing lumps and the like, impact grinders obviously contribute to the over-all mixing action. If desired, the minor ingredients may be included in step 1 and, in this event, step 4 can be eliminated. Best results are obtained, however, when the minor ingredients are added subsequently to the shearing and crushing step.

Cakes prepared from mixes containing polyvinyl pyrrolidone will exhibit improved height and will rate high with respect to tunnels and holes. Additionally, they will have improved grain and eating characteristics in terms of increased moisture.

To practice the present invention the following recipes are recommended for the purpose of evaluation of the results achievable in accordance with concept and principles of the invention:

Recipe No. 1

A typical yellow cake of the basic formulation containing 1.0 weight percent of polyvinyl pyrrolidone based on the dry weight of the total solids is prepared as follows.

| Ingredients: | Parts by weight |
|---|---|
| Sugar, industrial fine | 43.5 |
| Cake flour | 40.5 |
| Emulsified shortening | 11.0 |
| Non-fat milk solids | 1.5 |
| Sodium bicarbonate | 0.9 |
| Monocalcium phosphate | 0.4 |
| Sodium acid pyrophosphate | 0.8 |
| Salt | 0.7 |
| Dextrose | 0.3 |
| Flavoring | 0.2 |

After baking the cake will be characterized by greater moistness and of satisfactory eating quality.

Recipe No. 2

Comparable results are obtained for spice cakes based on Recipe No. 1 by the addition of the requisite spices.

Recipe No. 3

A typical devil's food cake of the basic formulation containing 0.5 weight percent of polyvinyl pyrrolidone based on the dry weight of the total solids is prepared as follows:

| Ingredients: | Parts by weight |
|---|---|
| Sugar, industrial fine | 35.0 |
| Cake flour | 33.5 |
| Emulsified shortening | 11.0 |
| Non-fat milk solids | 1.4 |
| Sodium bicarbonate | 1.8 |
| Monocalcium phosphate | 0.2 |
| Sodium acid pyrophosphate | 0.2 |
| Salt | 1.0 |
| Dextrose | 9.0 |
| Cocoa | 6.0 |
| Flavoring | 0.2 |

The resultant product, after preparation and baking provides a cake of acceptable eating quality and moistness.

Recipe No. 4

Marble cakes can be prepared by folding in equal parts of the batters from Recipes 1 and 3 and will have a high moisture content and good flavor.

While the invention has been described in several of its embodiments it is evident that modifications and variations thereof can be made without departing from the spirit and scope thereof. For example, the concept of the invention can be applied to any pulverulent culinary mix other than cake mixes where increased moisture retention and flavor are desired. Particles of the mix can also be treated subsequently to form agglomerates.

What is claimed is:

1. A dry prepared culinary mix containing sugar, farinaceous material and shortening, said mix having uniformly distributed therethrough a polyvinyl pyrrolidone in an amount of at least 0.01 weight percent based on the dry weight of the total solids of the mix.

2. A dry prepared culinary mix containing sugar, farinaceous material, shortening and a polyvinyl pyrrolidone, said polyvinyl pyrrolidone being present in an amount of from 0.01 to 10.0 weight percent based on the dry weight of the total solids of the mix.

3. A dry prepared culinary mix comprising 35–50 weight percent of sugar, from 35–50 weight percent farinaceous material, from 9–15 weight percent of shortening and from 0.01–10.0 weight percent of a polyvinyl pyrrolidone based on the dry weight of the total solids of the mix.

References Cited in the file of this patent
UNITED STATES PATENTS

| | | |
|---|---|---|
| 2,611,704 | Jaeger | Sept. 23, 1952 |
| 3,071,472 | Hager et al. | Jan. 1, 1963 |
| 3,109,738 | Tucker | Nov. 5, 1963 |